United States Patent
Kleymenov et al.

(10) Patent No.: US 11,671,449 B2
(45) Date of Patent: Jun. 6, 2023

(54) METHOD FOR AUTOMATIC AGGREGATING AND ENRICHING DATA FROM HONEYPOTS

(71) Applicant: Nozomi Networks Sagl, Mendrisio (CH)

(72) Inventors: Alexey Kleymenov, Massagno (CH); Alessandro Di Pinto, Malnate (IT); Moreno Carullo, Gavirate (IT); Andrea Carcano, San Francisco, CA (US)

(73) Assignee: NOZOMI NETWORKS SAGL, Mendrisio (CH)

( * ) Notice: Subject to any disclaimer, the term of this patent is extended or adjusted under 35 U.S.C. 154(b) by 115 days.

(21) Appl. No.: 17/493,903

(22) Filed: Oct. 5, 2021

(65) Prior Publication Data

US 2023/0106071 A1    Apr. 6, 2023

(51) Int. Cl.
  *H04L 9/40* (2022.01)

(52) U.S. Cl.
  CPC ............................ *H04L 63/1491* (2013.01)

(58) Field of Classification Search
  CPC .................................................. H04L 63/1491
  See application file for complete search history.

(56) References Cited

U.S. PATENT DOCUMENTS

| | | | | |
|---|---|---|---|---|
| 11,057,429 | B1 * | 7/2021 | Sellers | G06F 16/27 |
| 11,611,572 | B2 * | 3/2023 | Filonov | G06N 20/00 |
| 11,611,583 | B2 * | 3/2023 | Ben David | H04L 63/0263 |
| 2019/0289007 | A1 * | 9/2019 | Zhang | H04L 63/08 |
| 2021/0120022 | A1 * | 4/2021 | Kaderábek | H04L 63/1491 |
| 2022/0417262 | A1 * | 12/2022 | Kroustek | H04L 63/1483 |

FOREIGN PATENT DOCUMENTS

EP  3343869 A1 *  7/2018 ........... G06F 21/552

\* cited by examiner

*Primary Examiner* — Joseph P Hirl
*Assistant Examiner* — Thomas A Gyorfi
(74) *Attorney, Agent, or Firm* — Jason L DeFrancesco

(57) ABSTRACT

The present invention relates to a method for automatic aggregating and enriching data from honeypots comprising defining a plurality of identified honeypots of a different type to be monitored in a network; collecting metadata and samples from said honeypots of a different type in said network, which in turn comprises defining a predefined collection model for the honeypots such as to collect homogeneous metadata and samples among the honeypots of a different type, extracting the metadata according to the collection model defining a model metadata, and extracting the samples according to the collection model defining model samples; enriching said metadata and sample collected, which in turn comprises scanning the model metadata to extract IoCs, scanning the model samples to extract IoCs, recursively scanning the model samples to generate secondary model metadata and scanning the secondary model metadata to extract IoCs, until no further IoCs can be generated, recursively obtaining secondary samples from the extracted IoCs and scanning the secondary model samples to extract IoCs, until no further secondary samples are obtained; and aggregating said metadata and samples collected and/or enriched, which in turn comprises aggregating metadata by a predefined metadata model aggregation and aggregating samples by a predefined samples model aggregation.

13 Claims, No Drawings

METHOD FOR AUTOMATIC AGGREGATING AND ENRICHING DATA FROM HONEYPOTS

FIELD OF INVENTION

The present invention relates to the field of network security, in particular it relates to the field of data management for cybersecurity. More in particular, the present invention relates to a method for automatic aggregating and enriching data from honeypots.

BACKGROUND ART

Monitoring traffic in a network is a crucial way to acquire data relating to threats to computer and, consequently, to design an efficient security system. A known method to monitor and to analyze malicious traffic is by using honeypots.

In the cybersecurity field, with the term honeypot is meant a computer security mechanism set to detect, deflect, or, in some manner, counteract attempts at unauthorized use of information systems. Generally, a honeypot consists of data in a network that appears to be a legitimate part of the site and contain information or resources of value to attackers. It is actually isolated, monitored, and capable of blocking or analyzing the attackers and, since honeypot runs no production services, any contact with it is considered potentially malicious of suspicious by definition. Moreover, taking into consideration the latter aspect, honeypot reduces the amount of collected traffic and makes it a more valuable source of information.

The goal of honeypots is to attract and engage attackers for a sufficiently long period to obtain high-level Indicators of Compromise (IoC) such as attack tools and Tactics, Techniques, and Procedures (TTPs). Thus, a honeypot needs to emulate essential services in the production network and grant the attacker the freedom to perform adversarial activities to increase its attractiveness to the attacker.

Honeypots can give a reliable intelligence about how threats are evolving. They deliver information about attack vectors, exploits, and malware. Hackers continually refine their intrusion techniques, therefore the honeypots help to spot newly emerging threats and intrusions. Moreover, honeypots can also catch internal threats, for example showing vulnerabilities in such areas as permissions that allow insiders to exploit the system.

While honeypots will help chart the threat environment, they are not able to see everything that is going on. In particular, only activity that is directed at the honeypot can be identified. If a certain threat has not been directed against the honeypot, a direct consequence that such a threat does not exist cannot be assumed.

Moreover, it is still possible that, once a honeypot has been accessed, an attacker can create spoofed attacks to distract attention from a real exploit being targeted against the real production systems. Even worse, the attacker can also feed bad information to the honeypot.

Therefore, in order to improve the response time and stay as much proactive as possible, there is a need for a network of honeypots supporting various commonly misused protocols to be deployed.

BRIEF DESCRIPTION OF THE INVENTION

The object of the present invention is to provide a method capable to aggregate the data from a network of honeypots, enrich them and redirect to the corresponding systems for further use.

According to the present invention is described, therefore, a method for automatic aggregating and enriching data from honeypots in a network.

The method for automatic aggregating and enriching data from honeypots in a network comprises:
 defining a plurality of identified honeypots of a different type to be monitored in a network;
 collecting, by a computerized data processing unit, metadata and samples from the honeypots of a different type in the network;
 enriching, by the computerized data processing unit, the metadata and sample collected;
 aggregating, by the computerized data processing unit, the metadata and samples collected and/or enriched;
wherein the collecting comprises:
 defining a predefined collection model for the honeypots such as to collect homogeneous metadata and samples among the honeypots of a different type;
 extracting the metadata according to the collection model defining a model metadata;
 extracting the samples according to the collection model defining model samples;
wherein the enriching comprises:
 scanning the model metadata to extract IoCs;
 scanning the model samples to extract IoCs;
 scanning the model samples to generate secondary model metadata and scanning the secondary model metadata to extract IoCs;
 obtaining secondary samples from the extracted IoCs;
wherein the enriching is recursively repeated until no further secondary samples and extracted IoCs are obtained;
wherein the aggregating comprises:
 aggregating metadata by a predefined metadata model aggregation;
 aggregating samples by a predefined samples model aggregation.

In a further embodiment, the predefined collection model comprises identifying metadata IoCs, metadata techniques and metadata attributions.

In a further embodiment, the metadata IoCs comprise hashes, URLs, IP addresses and Domain Names.

In a further embodiment, the metadata techniques comprise protocols, credentials, vulnerabilities and commands.

In a further embodiment, the metadata attributions comprise type of detection and countries.

In a further embodiment, the collecting is made at predetermined time intervals.

In a further embodiment, the collecting is made every time one of the honeypots is reached.

In a further embodiment, the predefined metadata model aggregation aggregates metadata by executed commands.

In a further embodiment, the predefined metadata model aggregation aggregates metadata by number of connection attempts.

In a further embodiment, the predefined samples model aggregation aggregates samples by known attack signatures.

In a further embodiment, the predefined samples model aggregation aggregates samples by extracted IoCs.

In a further embodiment, the method for automatic aggregating and enriching data from honeypots in a network also comprises storing, in a storage unit of the permanent type operatively connected to the data processing unit, the extracted IoCs, said model samples and the secondary model sample.

In a further embodiment, the method for automatic aggregating and enriching data from honeypots in a network also comprises streaming, in a user system operatively connected to the data processing unit, the extracted IoCs, the model samples and the secondary model samples.

DETAILED DESCRIPTION OF THE INVENTION

The present invention relates to method for automatic aggregating and enriching data from honeypots in a network.

A honeypot looks like a real computer system, with applications and data, fooling attackers into thinking it is a legitimate target. For example, a honeypot could mimic a company's customer billing system. Once the attackers are in, they can be tracked, and their behavior assessed for clues on how to make the real network more secure.

Honeypots are made attractive to attackers by building in deliberate security vulnerabilities. For instance, a honeypot might have ports that respond to a port scan or weak passwords. Vulnerable ports might be left open to entice attackers into the honeypot environment, rather than the more secure live network.

Using a honeypot has several advantages over trying to spot intrusion in the real system. For instance, by definition, a honeypot should not get any legitimate traffic, so any activity logged is likely to be a probe or intrusion attempt. That makes it much easier to spot patterns, such as similar IP addresses (or IP addresses all coming from one country) being used to carry out a network sweep. The big advantage of using honeypot security is that these malicious addresses might be the only ones, making the attack much easier to identify.

Because honeypots handle very limited traffic, they are also resource light. They do not make great demands on hardware. Moreover, honeypots have a low false positive rate. That is in stark contrast to traditional intrusion-detection systems (IDS) which can produce a high level of false alerts. Again, that helps prioritize efforts and keeps the resource demand from a honeypot at a low level.

Therefore, honeypots are information tools that can help to understand existing threats to the business and spot the emergence of new threats. With the intelligence obtained from honeypots, security efforts can be prioritized and focused.

The method for automatic aggregating and enriching data from honeypots in a network, according to the present invention, make therefore use of honeypots and comprises:
  defining a plurality of identified honeypots of a different type to be monitored in a network;
  collecting, by a computerized data processing unit, metadata and samples from the honeypots of a different type in the network;
  enriching, by the computerized data processing unit, the metadata and sample collected;
  aggregating, by the computerized data processing unit, the metadata and samples collected and/or enriched;

Different types of honeypot can be used to identify different types of threats. Various honeypot definitions are based on the threat type that is addressed. All of them have a place in a thorough and effective cybersecurity strategy. Moreover, certain honeypots need minor modifications in order to better support intended threats.

After defining such a plurality of identified honeypots in the network, the method comprises collecting, by a computerized data processing unit, metadata and samples from the honeypots of a different type in the network.

In particular, the collecting comprises:
  defining a predefined collection model for the honeypots such as to collect homogeneous metadata and samples among the honeypots of a different type;
  extracting the metadata according to the collection model defining a model metadata;
  extracting the samples according to the collection model defining model samples.

Each honeypot is very different so bringing their outputs to the unified form is important before this data can be used. At this scope, the predefined collection model for honeypots preferably comprises a predefined collection model for metadata and a predefined collection model for samples. In particular, the predefined collection model for metadata consists of a set of uniform templates for the model metadata entries and dedicated pieces of code for each kind of honeypot to populate these templates from heterogeneous metadata coming from the associated honeypots. The same applies to the predefined collection model for samples which also includes using their hashes as filenames.

Templates defining model metadata include unique record ids, timestamps in the UTC time zone, honeypot name the original metadata is coming from, record type. Depending on the template, it may also include information about the associated protocol, attacker IP address, parent record information and the actual IoCs, techniques and attribution values.

In an embodiment, the predefined collection model comprises identifying metadata IoCs, metadata techniques and metadata attributions.

In particular, the metadata IoCs may comprise hashes, URLs, IP addresses and Domain Names. Furthermore, the metadata techniques may comprise protocols, credentials, vulnerabilities and commands. Finally, the metadata attributions may comprise type of detection and countries, the latter for example derived from source IP addresses.

The above-mentioned collecting could be made at predetermined time intervals or every time one of the honeypots is reached, according to a tradeoff between the necessities of exploitation and the available resources. The collecting at a predetermined time interval allows the aggregator to collect data from all honeypots sensor periodically, for example once per day, so that a system easy to be implemented and to be maintained is defined, without need to update the honeypots sensors, but with a delay between the collecting and any action to be taken. On the contrary the real-time collecting allows all data to reach the aggregator immediately once it hits the corresponding honeypots sensor, with a minimum delay between the collecting and any action to be taken, but the system is more difficult to implement and to maintain and requires certain updates for each sensor to start supporting this functionality.

According to the above, the preferred embodiment uses a the time interval approach, switching to the real-time approach only if necessary.

Moreover, the colleting of samples could be of passive type, such as everything explicitly sent to the honeypot, or of active type, additionally downloaded from extracted URLs.

After that, the method comprises enriching, by the computerized data processing unit, the metadata and sample collected.

In particular, the enriching comprises:
  scanning the model metadata to extract IoCs;
  scanning the model samples to extract IoCs;
  scanning the model samples to generate secondary model metadata and scanning the secondary model metadata to extract IoCs;

obtaining secondary samples from the extracted IoCs; wherein the enriching is recursively repeated until no further secondary samples and extracted IoCs are obtained.

Therefore, the enriching allows signature scanning, as well as obtaining samples from network artifacts and using them to produce more metadata in a recursive way to pass to the aggregator, such as Hashes, Network artifacts and Detections.

After that, the method comprises aggregating, by the computerized data processing unit, the metadata and samples collected and/or enriched.

In particular, the enriching comprises:
aggregating metadata by a predefined metadata model aggregation;
aggregating samples by a predefined samples model aggregation.

The aggregation is useful since finding correlations between outputs produced by different honeypots helps identify new and more dangerous threats. Moreover, differences in the situation in different geographical regions can be easily spotted. Furthermore, distinguishing between connection attempts and actual penetration helps establish different confidence thresholds for collected data In particular, aggregating samples by detection allows to identify undetected threats and build statistics over the prevalence of certain malware families in the wild. Aggregating IoCs allows to prioritize certain threats based on the frequency of their appearance across multiple honeypots representing the level of their activity and the corresponding danger.

Taking an example for metadata, the predefined metadata model aggregation may aggregate metadata by executed commands. Moreover, the predefined metadata model aggregation may aggregate metadata by number of connection attempts.

In the same way, taking an example for samples, the predefined samples model aggregation may aggregate samples by known attack signatures. Moreover, the predefined samples model aggregation may aggregate samples by extracted IoCs.

After aggregation, the method according to the present invention may comprise storing, in a storage unit of the permanent type operatively connected to the data processing unit, the extracted IoCs, the model samples and the secondary model sample. In this way, the stored data could be available for further processes or analysis according to the technical needs.

Moreover, as an alternative or in combination with the aforementioned storing, the method according to the present invention may comprise streaming, in a user system operatively connected to the data processing unit, the extracted IoCs, the model samples and the secondary model samples.

The method according to the present invention, therefore, allows to aggregate the data from a network of honeypots, enrich them and redirect to the corresponding systems for further use.

Moreover, the aggregation of the data allows to find correlations in attacks to identify new and more dangerous threats, to track variations in the situations in different geographical regions, to focus on actual penetration attempts rather than random connections to establish different confidence thresholds for collected data. Finally, combining data extraction, smart aggregation and enriching into a loop of avalanching data allows to obtain detailed information by the network on honeypots exploiting all their potentials.

The invention claimed is:

1. A method for automatic aggregating and enriching data from honeypots in a network comprising:
defining a plurality of identified honeypots of a different type to be monitored in a network;
collecting, by a computerized data processing unit, metadata and samples from said honeypots of a different type in said network;
enriching, by said computerized data processing unit, said metadata and sample collected;
aggregating, by said computerized data processing unit, said metadata and samples collected and/or enriched;
wherein said collecting comprises:
defining a predefined collection model for said honeypots such as to collect homogeneous metadata and samples among said honeypots of a different type;
extracting said metadata according to said collection model defining a model metadata;
extracting said samples according to said collection model defining model samples;
wherein said enriching comprises:
scanning said model metadata to extract IoCs;
scanning said model samples to extract IoCs;
scanning said model samples to generate secondary model metadata and scanning said secondary model metadata to extract IoCs;
obtaining secondary samples from said extracted IoCs;
wherein said enriching is recursively repeated until no further secondary samples and extracted IoCs are obtained;
wherein said aggregating comprises:
aggregating metadata by a predefined metadata model aggregation;
aggregating samples by a predefined samples model aggregation.

2. The method for automatic aggregating and enriching data from honeypots in a network according to claim 1, wherein said predefined collection model comprises identifying metadata IoCs, metadata techniques and metadata attributions.

3. The method for automatic aggregating and enriching data from honeypots in a network according to claim 2, wherein said metadata IoCs comprise hashes, URLs, IP addresses and Domain Names.

4. The method for automatic aggregating and enriching data from honeypots in a network according to claim 2, wherein said metadata techniques comprise protocols, credentials, vulnerabilities and commands.

5. The method for automatic aggregating and enriching data from honeypots in a network according to claim 2, wherein said metadata attributions comprise type of detection and countries.

6. The method for automatic aggregating and enriching data from honeypots in a network according to claim 1, wherein said collecting is made at predetermined time intervals.

7. The method for automatic aggregating and enriching data from honeypots in a network according to claim 1, wherein said collecting is made every time one of said honeypots is reached.

8. The method for automatic aggregating and enriching data from honeypots in a network according to claim 1, wherein said predefined metadata model aggregation aggregates metadata by executed commands.

9. The method for automatic aggregating and enriching data from honeypots in a network according to claim 1, wherein said predefined metadata model aggregation aggregates metadata by number of connection attempts.

10. The method for automatic aggregating and enriching data from honeypots in a network according to claim 1, wherein said predefined samples model aggregation aggregates samples by known attack signatures.

11. The method for automatic aggregating and enriching data from honeypots in a network according to claim 1, wherein said predefined samples model aggregation aggregates samples by extracted IoCs.

12. The method for automatic aggregating and enriching data from honeypots in a network according to claim 1, wherein it also comprises storing, in a storage unit of the permanent type operatively connected to said data processing unit, said extracted IoCs, said model samples and said secondary model sample.

13. The method for automatic aggregating and enriching data from honeypots in a network according to claim 1, wherein it also comprises streaming, in a user system operatively connected to said data processing unit, said extracted IoCs, said model samples and said secondary model samples.

* * * * *